UNITED STATES PATENT OFFICE.

CHARLES HORNBOSTEL, OF NEW YORK, N. Y.

COMBUSTION PROCESS.

SPECIFICATION forming part of Letters Patent No. 659,029, dated October 2, 1900.

Application filed September 3, 1897. Serial No. 650,529. (No specimens.)

*To all whom it may concern:*

Be it known that I, CHARLES HORNBOSTEL, a citizen of the United States, residing at New York, in the county of New York and State of New York, have invented certain new and useful Improvements in the Combustion of Fuel; and I do hereby declare that the following is a clear, full, and exact description of the invention, which will enable others skilled in the art to which it appertains to make and use the same.

Heretofore the combustion of fuel has been sustained on atmospheric air in its normal state. For obtaining higher degrees of heat the air has been heated mostly by waste gases, for example, in the reduction of ores in blast-furnaces and in other metallurgical operations. Chemically-generated oxygen and oxygen mixed with air have been used, and of late Siemens & Halske have submitted the air to the action of electricity derived from well-known sources for increasing its affinity for carbon. Electric processes have been applied for obtaining calorific effects of high energy in fusing and treating refractory metals and substances.

The object of my invention is to prepare atmospheric air in such a manner and for the purpose that the oxygen in said air becomes better adapted for sustaining and perfecting combustion and that the volume of air which is necessary for converting a stated quantity of carbon into carbonic-acid gas may be decreased and the intensity of heat from said carbon be increased, and also that a clean heat and flame be obtained from sulphurous fuel; and to this end my invention consists in leading a current of air into intimate contact with a chemical compound of sulphuric acid and manganate of soda or its chemical equivalent, as hereinafter described. I have found that when said air is manipulated by contact with said chemical compound its efficiency for sustaining combustion and for inducing high temperatures and clean heats is much increased.

In carrying my invention into effect I do not depend on any definite mechanical arrangement for leading a current of air into intimate contact with said chemical compound. Said arrangement may depend and be made so as to be adapted to existing conditions. I may use an air-forcing apparatus of any desired construction and connect, for example, the opening through which the air is discharged from a fan-blower or air-pump with a compartment for holding and receiving said chemical compound, at the same time connecting said compartment with the place where said prepared air is applied, which ordinarily would be the ash-pit or base of a furnace. I may construct a shallow longitudinal compartment and lead the air in at one end and out at the opposite end and over the said chemical compound spread over the bottom of said compartment. I may also discharge the air from an air-forcing apparatus in a spray down upon the mass of said chemicals in said compartment, or I may, for increasing the contact-surface of said chemical compound in said compartment, place therein a mass of any porous materials, such as pumice-stone or coke and especially such material which will hold and absorb in its pores the liquid portions in said chemical compound I spread said chemical compound over said porous materials. I select pieces of porous materials of sufficiently-large size for allowing a current of air to pass through the intervening spaces of said pieces placed one over the other in said compartment. I may use any device by means of which a current of air is forced into intimate contact with said chemical compound. I construct said compartment of materials which are used and known to be adapted for holding acids and arrange in said compartment manholes or similar openings for filling in and removing said chemicals as this may be required. I have found that said chemical compound sustains but little loss in matter and that its efficiency becomes but slowly exhausted. Its loss in property of acting on the atmospheric oxygen is mainly due to the absorption by the sulphuric acid in said chemical compound, which said acid when saturated with moisture and exhausted has to be removed and renewed more frequently in said chemical compound than the said manganate of soda therein. I use the ordinary commercial sulphuric acid. I prefer to prepare said manganate of soda by fusing four parts, by weight, of caustic soda and two parts of per-oxide of manganese and one part of saltpeter. I may use the chemical equivalent of caustic soda, which is caustic potash, and instead of manganate of soda I may use manganate of potash, which is the chemical equivalent of manganate of soda. I may use per-manganate of potash, which is the chemical equivalent of manganate of soda and of manganate of potash in a refined and crystallized state. I may use any commercial manganate of soda or manganate of potash or per-manganate of potash. I prefer to use the manganate of soda and manganate of potash, prepared as hereinbefore described, on account of its low cost. In arranging said compound in said compartment for use I prefer to mix one pound of manganate of soda with from six to fifteen pounds of sulphuric acid. I prefer to use the greater portions of sulphuric acid when I spread said chemical compound over a mass of porous materials, as described hereinbefore. I prefer to mix together but small portions of said chemicals at a time for preventing effervescence and odors. For sustaining, for example, the combustion of twenty tons of coal in twenty hours in furnaces I may fill into said compartment a compound composed, when commencing the operation, of four pounds of manganate of soda and twenty pounds of sulphuric acid. After having blown for twenty hours over or into said compound the volume of air required for sustaining the combustion of said twenty tons of coal I renew said compound every twenty hours by adding one pound of manganate of soda and six pounds of sulphuric acid, or I may renew said compound every ten hours by adding one-half of said compound.

I am aware that the reaction of per-manganate of potash and sulphuric acid has been known heretofore. However, I am not aware that said chemicals or their chemical equivalents have been utilized in the manner hereinbefore described for sustaining and perfecting combustion.

I am aware that oxygen obtained from a compound of per-oxide of manganese and sulphuric acid has been added to air for sustaining combustion; but my invention does not relate to said process, inasmuch as the chemical compound which I employ is known to yield ozone, while a compound of per-oxide of manganese and sulphuric acid is a source of generating oxygen, but not ozone; the reaction of per-manganate of potash or its chemical equivalent and sulphuric acid produces no oxygen. I do not claim to produce and apply to the process of combustion any more oxygen than what is contained in the atmospheric air; but What I do claim as my invention, and desire to secure by Letters Patent, is—

In the combustion of fuel, the process of forcing the air on which said combustion is sustained, into intimate contact with a compound of manganate of soda and sulphuric acid and in forcing said air after said contact into a mass of ignited fuel, all substantially as set forth.

CHARLES HORNBOSTEL.

Witnesses:
MARY B. LETTENBERGER,
SAMUEL J. MURPHY.